United States Patent
Frank et al.

[11] Patent Number: 6,034,608
[45] Date of Patent: Mar. 7, 2000

[54] TORNADO ALARM SYSTEM

[76] Inventors: Henry Frank, 1903 Kuskokwim St., Anchorage, Ak. 99508; Michael Frank Johnnie, 6905 Whitehall, Anchorage, Ak. 99502

[21] Appl. No.: 09/338,347

[22] Filed: Jun. 22, 1999

[51] Int. Cl.⁷ .................................................. G01W 1/00
[52] U.S. Cl. ..................... 340/601; 340/690; 340/602; 340/511; 340/236; 73/170.16; 73/384; 702/3; 342/26
[58] Field of Search ................... 340/601, 602, 340/511, 521, 522, 236, 690, 241; 73/170.16, 384; 702/3; 342/26; 364/420; 367/13

[56] References Cited

U.S. PATENT DOCUMENTS

| | | | |
|---|---|---|---|
| 3,631,435 | 12/1971 | Elenbaas | 340/236 |
| 3,646,540 | 2/1972 | Cooper | 340/241 |
| 3,717,861 | 2/1973 | Wright, Jr. | 340/236 |
| 5,117,359 | 5/1992 | Eccles | 364/420 |
| 5,355,350 | 10/1994 | Bass et al. | 367/13 |
| 5,801,636 | 9/1998 | Tatom et al. | 340/690 |
| 5,867,805 | 2/1999 | Brown | 702/3 |

*Primary Examiner*—Jeffrey A. Hofsass
*Assistant Examiner*—Phung Nguyen
*Attorney, Agent, or Firm*—Michael J. Tavella

[57] ABSTRACT

A tornado alarm that monitors humidity, static charge in the air and the barometric pressure. Nothing happens until the level of static electricity increases to a set amount over a stored base level and the humidity reaches 100 percent. At this point the first stage alarm is activated. The device sends out an initial blast followed by a report every 60 seconds during this mode of operation. At this point, the user is awakened by the alert. The user then can turn on news reports to verify danger. Once awake, if danger exists, the user can prepare for a tornado and be ready. When the barometric pressure reaches 28 millibars, the third condition is reached. Under most circumstances, a tornado is then immanent. This sets the device into the second stage alert mode. In this mode, a continuous alarm sounds.

9 Claims, 3 Drawing Sheets

TORNADO ALARM SYSTEM

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to tornado alarm systems and particularly to tornado alarm systems that monitor three weather parameters.

2. Description of Related Art

Tornadoes are some of the most devastating of all weather phenomena. Part of the significance of their power is that they are relatively unpredictable. Although forecasters can monitor conditions for a wide area, there is no simple way to pinpoint where a tornado may hit. Once on the ground, a tornado is easy to monitor, but by then, it is often too late for victims in its path. If a tornado hits during waking hours, it is much more likely that people's lives may be saved. Warnings can be broadcast over the affected area and people will most likely hear them. It is at night, when people are sleeping that there is the most danger.

To help in these efforts, tornado alarms have been invented. Although these devices may prove useful, they are not as effective as they could be. Many devices monitor a single parameter associated with tornadoes. For example, U.S. Pat. Nos. 5,612,667, 3,631,435, 3,646,540, and 4,632,052, all use barometric pressure to alert the user to the presence of a tornado. It is well known that a sudden drop in barometric pressure occurs just before a tornado strike. Unfortunately, the drop occurs at the time of inception of the tornado. In other words, when the tornado is already there. Thus, these devices do not give enough time for an adequate warning. Moreover, by focusing only on the barometric pressure, there are likely to be times when the alarm does not really indicate a tornado. Such false alarms reduce the usefulness of these devices.

U.S. Pat. No. 4,812,825 uses a superhetrodyne receiver to detect electromagnetic energy produced by a tornado. This device, like the others above, only measures one parameter associated with tornadoes, produces an alarm only when the tornado is very close, and is subject to confusion from other radio signals and noise.

U.S. Pat. Nos. 5,379,025 and 5,801,636 measure seismic waves generated by tornadoes. As before, the problem with these devices is that they only measure one parameter, it is a parameter that only exists when a tornado is very close, and it is subject to confusion and false signals due to other causes of seismic activity.

U.S. Pat. No. 5,867,805 takes a different approach. This patent uses a small computer that monitors all of the essential weather data, temperature, static electricity, humidity, barometric pressure, and others. It is also linked to an emergency broadcasting radio station. This device remains silent until and emergency signal is broadcast. The device then begins to monitor local weather conditions (if one chooses that mode). These data are then compared to a stored database of weather conditions for several years. When the conditions match a previous dangerous condition, the computer alerts the user to the danger. Although this device is less subject to false alarms, it first requires an emergency broadcast signal and then it must find a similar weather pattern in the database before it will alert the user. If there is no signal or if the perceived pattern is not stored; there is no warning.

BRIEF SUMMARY OF THE INVENTION

All of these limitations and problems have been eliminated in the present invention. It is an electronic monitor that measures humidity, static charge in the air and the barometric pressure. Nothing happens until the level of static electricity increases to a set amount over a stored base level and the humidity reaches 100 percent. At this point the first stage alarm is activated. The device sends out an initial blast followed by a report every 60 seconds during this mode of operation. At this point, the user is awakened by the alert. The user then can turn on news reports to verify danger. Once awake, if danger exists, the user can prepare for a tornado and be ready. When the barometric pressure reaches 28 millibars, the third condition is reached. Under most circumstances, a tornado is then immanent. This sets the device into the second stage alert mode. In this mode, a continuous alarm sounds.

It is an object of this invention to produce a warning system for tornadoes that monitors three essential weather parameters.

It is another object of this invention to produce a warning system for tornadoes that has a two stage alert system.

It is yet another object of this invention to produce a warning system for tornadoes that uses two parameters to establish a first stage alert status and then uses a third parameter to activate a second stage alarm.

DETAILED DESCRIPTION OF THE INVENTION

Figure 1:
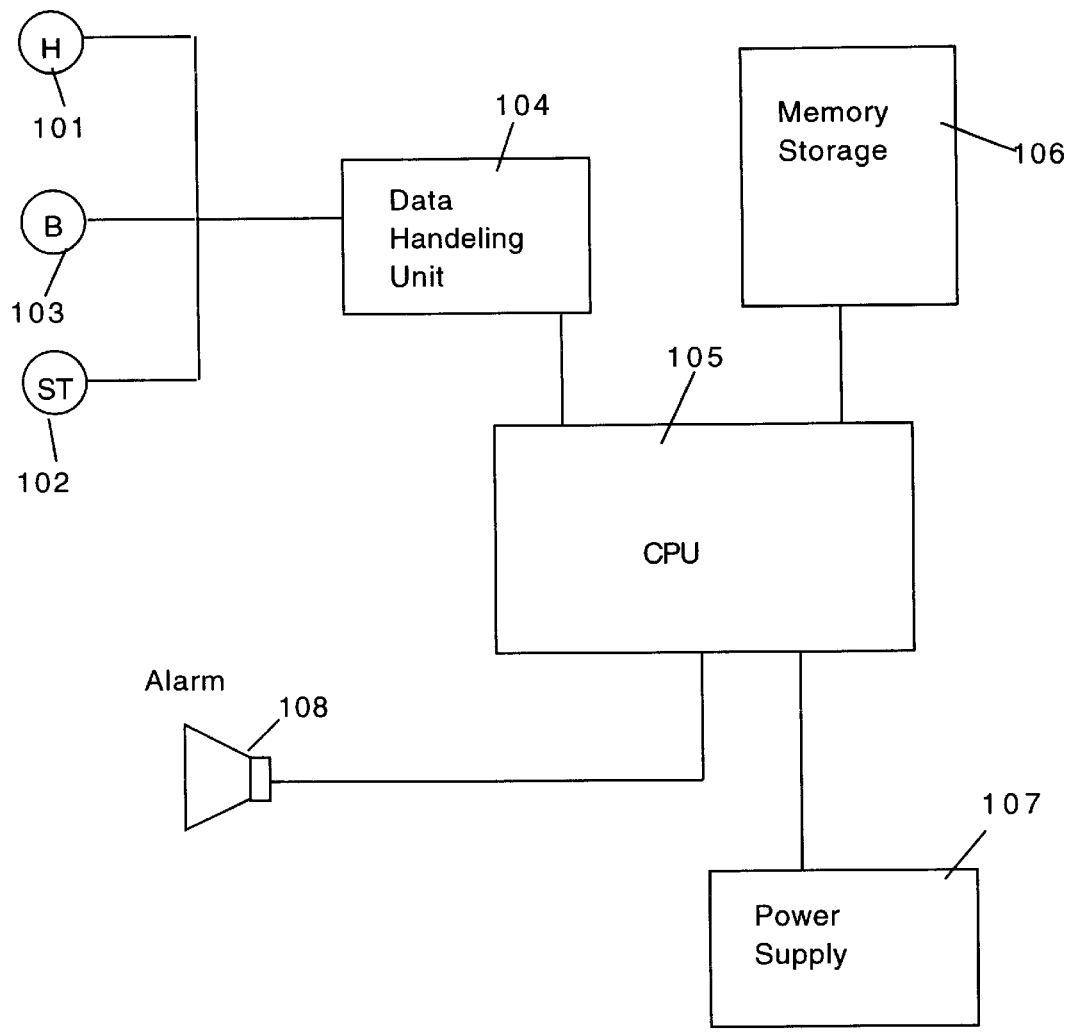
FIG. 1 is a block diagram of the system components.

Referring now to FIG. 1, the elements of the system are shown in block diagram. The system 1 has three environmental sensors. The first sensor 101 monitors humidity. The second sensor 102 measures the level of static charge in the air. The third sensor 103 measures the barometric pressure. These three inputs are sent to a data-handling unit 104. The data handling unit converts the signals received from the sensors into a useable data stream. The components of this unit vary depending on the type of sensors used. For example, for an analog humidity meter, an analog to digital (A/D) converter is used. If the signals are digital, only signal conditioning may be required. These circuits are well known in the art and are beyond the scope of this patent. A humidity sensor 101 such as model Minicap 2/5, manufactured by Panametrics Corporation senses ambient humidity. A static charge sensor 102 such as model KML10/B/2, manufactured by Phillips Semiconductor senses ambient static potential and a barometric pressure sensor 103 such as model MPX200A, manufactured by Motorola Corporation senses the ambient air pressure. Of course, any other similar type of sensor can be used, with adjustments in the data handling circuits as needed.

The data is fed from the data-handling unit 104 to a central processing unit (CPU) 105. The CPU has a memory storage area 106, a power supply 107 and an alarm device 108 that are connected to the CPU using ordinary methods.

The pressure 103 and humidity 101 sensors provide readouts to the CPU 105 that are compared to the stored levels of 100 percent humidity and a pressure of 28 inches Hg or less. In the case of the static charge meter, the level of static charge is set by calibrating the unit during a period of normal weather. The controller then measures increases in the level of static charge in the air as compared to the base level determined at the initialization of the unit. The device can be set to trigger the alarm at any setting of static charge over the base. In the preferred embodiment, the system is set to trigger an alarm state at a static level between about 25 and 50 percent above the base level of static charge.

Figure 2:
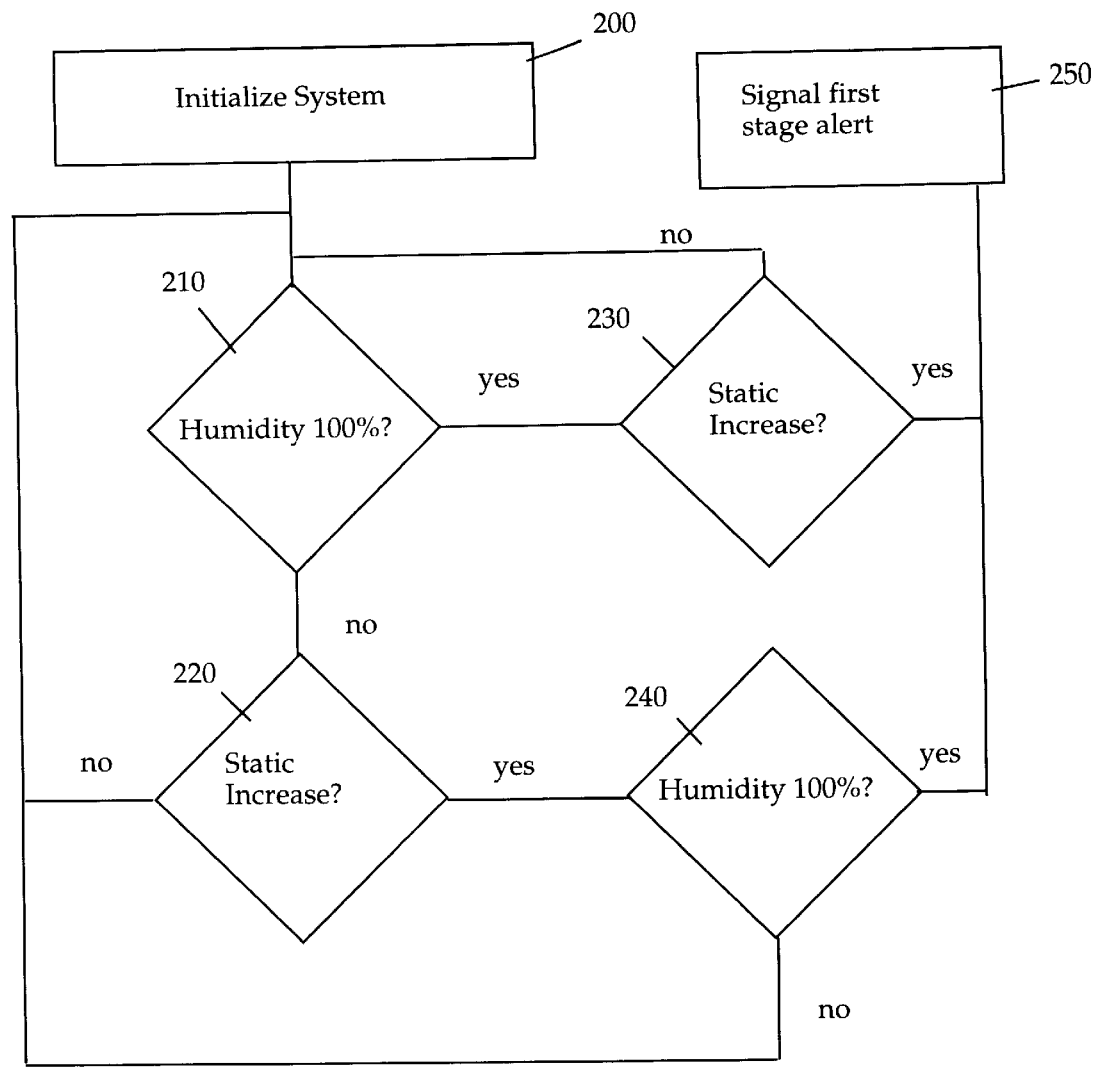
FIG. 2 is a flow chart showing steps of operation of the first stage alarm system.
Figure 3:
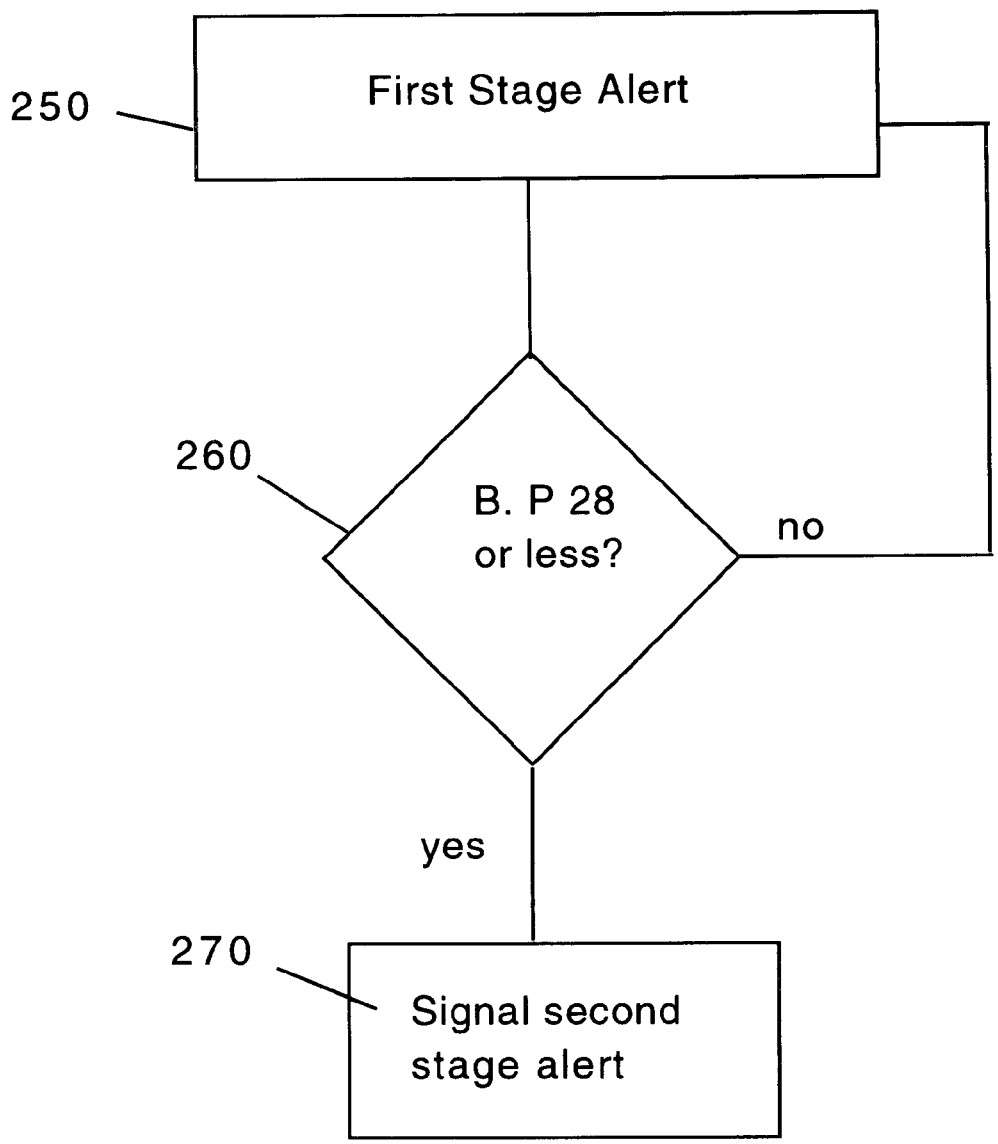
FIG. 3 is a flow chart showing steps of operation of the second stage alarm system

Referring now to FIGS. 2 and 3, details of the operation are shown. The CPU is set for a two stage alert operation. FIG. 2 shows a flow chart for this operation. In this mode, the CPU checks the static charge measurements and the humidity measurements against the stored levels. This system operates in a continuous loop, checking the parameters until both the humidity and static charge reach the alarm levels. Once the two trigger points are reached, the first alarm is tripped. In this stage, in the preferred embodiment, an initial alert blast is sounded. The signal can be any type of signal, but the preferred embodiment uses a tone that begins as a continuous note for a number of seconds (e.g., ten seconds) followed by a number of timed shorter tones (e.g., a note every 60 seconds). This warning alerts people that the potential for tornadoes exists in the area. During this stage of the alert, users can verify the threat by tuning into weather broadcasts. If danger does exist, the user can prepare shelter.

As the figure shows, the first step in the loop is the system initialization 200. In this step, the static charge is read to determine a base level. This base level is then stored in the memory. In the next step 210, the system checks the humidity, If the humidity is less than 100 percent, the system moves at block 220 to check the level of static charge. At this step, the level is compared to the base level. If the system looks for an increase in static charge of between about 125 and 150 percent of the base level. If this level is not found, the system moves back to the top of block 210 and then cycles through the first loop. This cycle continues until an alert condition is reached. Note that the order of checking is not important. The static charge and humidity blocks can be interchanged in this flowchart with no adverse effects.

If the humidity reaches 100 percent, the system checks the static charge in block 230. Similarly, if the static charge increase is found, the system checks the humidity in block 240. The system cycles through until both conditions are satisfied. At that point, the system signals a first stage alert (block 250).

FIG. 3 shows the flow chart for the second stage alert. Once the first stage alert 250 has been tripped, it remains set until reset by the user. The CPU then monitors the barometric pressure readings in the area at block 260. The system cycles through the first stage alert until the barometric pressure drops to or below 28 inches of Hg. At that time, the second stage alert is activated at block 270. In the second stage alert, the alarm signal becomes a continuous blast. This alerts the user to immediate danger and the user should take shelter.

Of course, numerous modifications are possible. The power supply could be batteries, or it can be hard wired to the house current, or both. Many different types of alarm device can be used. However, the preferred tone is different from other alarm sounds currently in use (such as smoke detectors). Finally, many different types of sensors can be used as long as the necessary converters and data handlers are used.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

We claim:

1. A tornado warning device comprising:
   a) a means for sensing humidity;
   b) a means for sensing barometric pressure;
   c) a means for sensing ambient static charge;
   d) a central processing unit;
   e) whereby the means for sensing humidity, the means for sensing barometric pressure and the means for sensing ambient static charge are connected to the central processing unit;
   f) a memory storage unit, connected to said central processing unit;
   g) a means for sounding a first stage alarm, whereby said means for sounding a first stage alarm is activated when measured levels of humidity and static charge reach predetermined levels of humidity and static charge that are stored within said memory storage unit; and
   h) a means for sounding a second stage alarm, whereby said means for sounding a second stage alarm is activated after said means for sounding a first stage alarm is activated and when a measured level of barometric pressure reaches a predetermined level of barometric pressure stored within said memory storage unit.

2. The tornado warning device of claim 1 wherein the predetermined level of humidity is 100 percent humidity.

3. The tornado warning device of claim 1 wherein the predetermined level of barometric pressure is 28 inches of mercury.

4. The tornado warning device of claim 1 wherein the predetermined level of static charge is between about one hundred twenty-five percent and one-hundred fifty percent of a base level of static charge stored in said memory storage unit.

5. The tornado warning device of claim 4 wherein the central processing unit includes a means for comparing a base level of static charge and an ambient level of static charge.

6. A method of detecting and warning of impending tornadoes comprising the steps of:
   a) sensing a ambient relative humidity level;
   b) sensing a ambient level of static charge;
   c) sensing a level of barometric pressure;
   d) comparing the sensed levels of humidity, static charge and barometric pressure to a predetermined level of humidity, static charge and barometric pressure; and
   e) sounding an alarm when the sensed levels of humidity, static charge and barometric pressure reach the predetermined level of humidity, static charge and barometric pressure; wherein the step of sounding an alarm includes:

i) sounding a first level alarm when the sensed levels of humidity and static charge reach the predetermined levels; and b) sounding a second stage alarm when the sensed level of barometric pressure reaches the predetermined level of barometric pressure.

7. The method of detecting a tornado of claim 6 wherein the predetermined level of humidity is 100 percent humidity.

8. The method of detecting a tornado of claim 6 wherein the predetermined level of barometric pressure is 28 inches of mercury.

9. The method of detecting a tornado of claim 6 further including the steps of:

a) setting a base level of an ambient static charge;

b) storing the base level of an ambient static charge and establishing that level as a predetermined level of static charge;

c) comparing the ambient level of static charge to the predetermined level; and d) triggering an alarm status when the ambient level of static charge reaches a level between about 125 percent and 150 percent of the base level.

* * * * *